US012707081B2

(12) United States Patent
Wang et al.

(10) Patent No.: US 12,707,081 B2
(45) Date of Patent: Aug. 11, 2026

(54) MOTION VECTOR RESOLUTION BASED MOTION VECTOR PREDICTION FOR VIDEO CODING

(71) Applicant: Google LLC, Mountain View, CA (US)

(72) Inventors: Yunqing Wang, Palo Alto, CA (US); Jingning Han, Santa Clara, CA (US); Bohan Li, Santa Clara, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/811,455

(22) Filed: Aug. 21, 2024

(65) Prior Publication Data

US 2025/0071319 A1 Feb. 27, 2025

Related U.S. Application Data

(60) Provisional application No. 63/594,778, filed on Oct. 31, 2023, provisional application No. 63/533,743, filed on Aug. 21, 2023.

(51) Int. Cl.

| | |
|---|---|
| ***H04N 19/52*** | (2014.01) |
| ***H04N 19/105*** | (2014.01) |
| ***H04N 19/139*** | (2014.01) |
| ***H04N 19/176*** | (2014.01) |
| ***H04N 19/182*** | (2014.01) |
| ***H04N 19/46*** | (2014.01) |

(52) U.S. Cl.
CPC ........... *H04N 19/52* (2014.11); *H04N 19/105* (2014.11); *H04N 19/139* (2014.11); *H04N 19/176* (2014.11); *H04N 19/182* (2014.11); *H04N 19/46* (2014.11)

(58) Field of Classification Search
CPC ........................................................ H04N 19/52
USPC ........................................ 375/240.01–240.29
See application file for complete search history.

(56) References Cited

U.S. PATENT DOCUMENTS

2012/0320969 A1* 12/2012 Zheng .................... H04N 19/40 375/E7.125
2015/0195562 A1* 7/2015 Li ........................ H04N 19/109 375/240.16

* cited by examiner

*Primary Examiner* — Leron Beck

(74) *Attorney, Agent, or Firm* — Young Basile Hanlon & MacFarlane P.C

(57) ABSTRACT

Techniques are described for motion vector resolution based motion vector prediction for video coding. A motion vector precision level for coding a current block is determined, a motion vector reference list is generated using the motion vector precision level, an index into the motion vector reference list is determined, where the index identifies a motion vector candidate from the motion vector reference list, and a motion vector for inter prediction of the current block is coded using the motion vector candidate. The motion vector precision level can indicate a single resolution for generating the motion vector reference list or a first resolution for generating the motion vector reference list and a second resolution for coding motion vector residuals of the motion vector.

20 Claims, 11 Drawing Sheets

FIG. 7C

MOTION VECTOR RESOLUTION BASED MOTION VECTOR PREDICTION FOR VIDEO CODING

REFERENCES TO RELATED APPLICATIONS

This application claims priority to U.S. Provisional Patent Application Ser. No. 63/533,743, filed Aug. 21, 2023, and to U.S. Provisional Patent Application Ser. No. 63/594,778, filed Oct. 31, 2023, the entire disclosures of which are incorporated herein by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other coding techniques. These techniques may include both lossy and lossless coding techniques.

SUMMARY

This disclosure relates generally to encoding and decoding video data using motion vector prediction and more particularly relates to motion vector prediction for video coding based on the motion vector resolution.

An aspect of the disclosed implementations is a method for coding a current block. The method includes determining a first motion vector for inter-prediction of a current block, determining a motion vector for inter-prediction of a reference block coded before the current block, and determining that a difference between the motion vector and a motion vector candidate stored in a motion vector reference list is greater than a threshold value. The threshold value depends on a resolution of the first motion vector. The method further includes storing the motion vector in the motion vector reference list and predicting the first motion vector for the current block using a selected motion vector candidate from the motion vector reference list.

Another aspect of the disclosed implementations is another method for coding a current block that includes determining a current motion vector for inter-prediction of a current block, determining a motion vector for inter-prediction of a block coded before the current block, and determining a difference between the motion vector and a motion vector candidate stored in a motion vector reference list is less than a threshold value. The threshold value is based on a resolution of the current motion vector. The method further includes excluding the motion vector from the motion vector reference list and predicting the current motion vector for the current block using at least one motion vector candidate from the motion vector reference list.

Another aspect of the disclosed implementations is an apparatus for coding a current block. The apparatus includes at least one processor configured to determine a current motion vector for inter-prediction of a current block, determine a motion vector for inter-prediction of a block coded before the current block, and compare the motion vector to at least one motion vector candidate stored in a motion vector reference list. In response to determining a difference between the motion vector and a motion vector candidate is greater than or equal to a threshold value based on a resolution of the current motion vector, the processor is configured to store the motion vector in the motion vector reference list. In response to determining the difference between the motion vector and the motion vector candidate is less than the threshold value, the processor is configured to exclude the motion vector from the motion vector reference list. The processor is further configured to predict the current motion vector for the current block using at least one motion vector candidate from the motion vector reference list.

Another aspect of the disclosed implementations is an apparatus for building a motion vector reference list for predicting a motion vector for inter-prediction of a current block. The apparatus includes a processor configured to perform a method that includes determining respective motion vectors for inter-prediction of reference blocks coded before the current block and determining, for a respective motion vector of the motion vectors, whether the motion vector is a distinctive motion vector. Determining whether the motion vector is a distinctive motion vector includes determining an absolute difference between the motion vector and an existing motion vector in the motion vector reference list for the current block and comparing the absolute difference to a threshold value, wherein the motion vector is a distinctive motion vector if the absolute difference is greater than or equal to the threshold value and the threshold value is based on a motion vector resolution for the current block. The method further includes adding the motion vector to the motion vector reference list responsive to the motion vector being the distinctive motion vector, and otherwise excluding the motion vector from the motion vector reference list.

Another aspect of the disclosed implementations is another method for coding a current block. The method includes determining a motion vector precision level, generating a motion vector reference list using the motion vector precision level, and coding an index to the motion vector reference list. The index identifies a selected motion vector candidate from the motion vector reference list. The method further includes coding a motion vector difference between a current motion vector and the selected motion vector candidate using the motion vector precision level.

Another aspect of the disclosed implementations is a method for decoding a current block. The method includes determining, from an encoded bitstream, a motion vector precision level for decoding a current block, generating a motion vector reference list using a precision indicated by the motion vector precision level, determining, using an index to the motion vector reference list, a motion vector predictor, and determining, from the encoded bitstream, a motion vector difference. A resolution of the motion vector difference is indicated by the motion vector precision level. The method further includes decoding the current block using a motion vector determined by adding the motion vector difference to the motion vector predictor.

Another aspect of the disclosed implementations is another method for coding a current block. The method includes determining a motion vector precision level, determining a first motion vector for inter prediction of a current block, determining a motion vector for inter prediction of a reference block coded before the current block, and determining that a difference between the motion vector and a motion vector candidate stored in a motion vector reference list is greater than a threshold value. The threshold value depends on the motion vector precision level. The method further includes storing the motion vector in the motion vector reference list, determining a motion vector difference, and predicting the first motion vector for the current block using a selected motion vector candidate from the motion vector reference list and the motion vector difference. The motion vector difference depends on the motion vector precision level.

Another aspect of the disclosed implementations is another apparatus for coding a current block. The apparatus includes at least one processor configured to determine, from an encoded bitstream, a motion vector precision level for coding a current block, determine a current motion vector for inter prediction of a current block, determine a motion vector for inter prediction of a block coded before the current block, and compare the motion vector to at least one motion vector candidate stored in a motion vector reference list. Responsive to determining a difference between the motion vector and a motion vector candidate is greater than or equal to a threshold value based on the motion vector precision level, the processor is configured to store the motion vector in the motion vector reference list. Responsive to determining the difference between the motion vector and the motion vector candidate is less than the threshold value, the processor is configured to exclude the motion vector from the motion vector reference list. The processor is further configured to determine a motion vector difference using the motion vector precision level and predict the current motion vector for the current block using at least one motion vector candidate from the motion vector reference list and the motion vector difference.

Another aspect of the disclosed implementations is a method that includes determining a motion vector precision level for coding a current block, generating a motion vector reference list using the motion vector precision level, determining an index into the motion vector reference list, the index identifying a motion vector candidate from the motion vector reference list, and coding a motion vector for inter prediction of the current block using the motion vector candidate.

Another aspect of the disclosed implementations is an apparatus that includes at least one processor configured to determine a motion vector precision level for coding a current block, generate a motion vector reference list using the motion vector precision level, determine an index into the motion vector reference list, the index identifying a motion vector candidate from the motion vector reference list, and code a motion vector for inter prediction of the current block using the motion vector candidate.

Another aspect of the disclosed implementations is a non-transitory, computer-readable storage medium storing a compressed bitstream comprising encoded transform coefficients corresponding to pixel information of the current block, an identifier of a motion vector precision level used for generating a motion vector reference list, and an index into the motion vector reference list that identifies a motion vector candidate from the motion vector reference list that is used to code a motion vector for inter prediction of the current block.

It will be appreciated that aspects can be implemented in any convenient form. For example, aspects may be implemented by appropriate computer programs that may be carried on appropriate carrier media such as a tangible carrier media (e.g., disks) or intangible carrier media (e.g., communications signals). Aspects may also be implemented using suitable apparatus, which may take the form of programmable computers running computer programs arranged to implement the methods and/or techniques disclosed herein. For example, a non-transitory, computer-readable storage medium may include executable instructions that, when executed by a processor, facilitate performance of operations operable to cause the processor to carry out any of the methods described herein. Aspects can be combined such that features described in the context of one aspect may be implemented in another aspect.

These and other aspects of the present disclosure are disclosed in the following detailed description of the embodiments, the appended claims, and the accompanying figures.

BRIEF DESCRIPTION OF THE DRAWINGS

The description herein refers to the accompanying drawings described below wherein like reference numerals refer to like parts throughout the several views unless otherwise described.

FIG. 7C illustrates an example of determining motion vector candidates for a current block based on non-adjacent spatial candidates of the current block.

DETAILED DESCRIPTION

Figure 1:
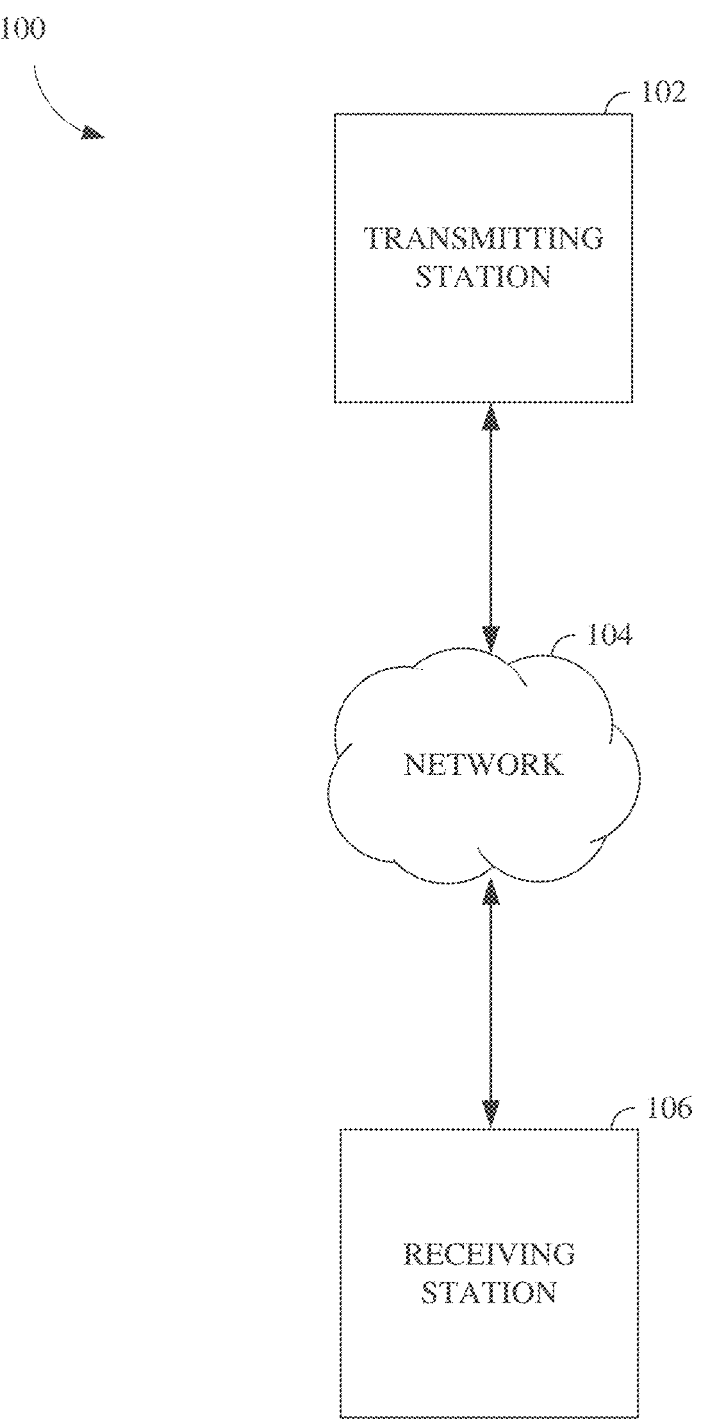
FIG. 1 is a schematic of a video encoding and decoding system.

As mentioned, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal similarities in the video stream to improve coding efficiency. For example, a current block of a video stream may be encoded based on identifying a difference (residual) between the previously coded pixel values, or between a combination of previously coded pixel values, and those in the current block.

Encoding using temporal similarities may be referred to as inter prediction or motion-compensated prediction (MCP). A prediction block of a current block (i.e., a block being coded) is generated by finding a corresponding block in a reference frame following a motion vector (MV). That is, inter prediction attempts to predict the pixel values of a block using a possibly displaced block or blocks from a temporally nearby frame (i.e., a reference frame) or frames. A temporally nearby frame is a frame that appears earlier or later in time in the video stream than the frame (i.e., the current frame) of the block being encoded (i.e., the current block). An MV used to generate a prediction block refers to (e.g., points to or is used in conjunction with) a frame (i.e., a reference frame) other than the current frame. An MV may be defined to represent a block or pixel offset between the location of the prediction block in the reference frame and the corresponding block in the current frame.

Inter prediction can be performed either from a single reference frame or from two reference frames. Inter-prediction modes that perform motion compensation from two reference frames may be referred to as compound inter-prediction modes (or compound modes, for brevity). In compound modes, two MVs can be signaled to (or may be derived from a list of candidate MVs at) the decoder. For example, the motion vector(s) for a current block in inter prediction may be encoded into, and decoded from, a compressed bitstream. If both reference frames are, in display order, located on the same side from the current frame, the prediction mode may be referred to as a unidirectional compound prediction mode. If one of the reference frames is in the backward direction and another reference frame is in the forward direction in the display order, the compound mode may be referred to as a bidirectional prediction mode. Inter prediction using only a single reference frame is a unidirectional prediction mode.

As mentioned, a motion vector for a current block is described with respect to a block in a reference frame. The motion vector describes an offset (i.e., a displacement) in the horizontal direction (i.e., $MV_x$) and a displacement in the vertical direction (i.e., $MV_y$) from the block in the reference frame. As such, an MV can be characterized as a 3-tuple (f, $MV_x$, $MV_y$) where f identifies the reference frame (e.g., an index into a list of candidate reference frames), $MV_x$ is the offset in the horizontal direction from a collocated position of the current block within the reference frame, and $MV_y$ is the offset in the vertical direction from the collocated position within the reference frame. The offsets $MV_x$ and $MV_y$ may be written (i.e., encoded) into the compressed bitstream and read (i.e., decoded) from the encoded bitstream.

To lower the rate cost of encoding motion vectors, a predicted motion vector (PMV) may be selected from a list of motion vector candidates (also called a motion vector reference list herein) and reused as the MV for the current block or be used to encode the MV differentially. For example, a predicted motion vector (PMV) may be selected as a reference motion vector or motion vector predictor, and only a difference (also called the motion vector difference (MVD) or residual) between the motion vector of a current block and the motion vector predictor is encoded into the bitstream, along with an index into the motion vector reference listing identifying the selected motion vector predictor. In this case, MVD=MV−PMV. As alluded to above, coding a MV may include coding the horizontal offset (i.e., $MV_x$) and coding the vertical offset (i.e., $MV_y$) of the MV or coding the horizontal offset (i.e., $MVD_x$) and coding the vertical offset (i.e., $MVD_y$) of the MVD. When implemented by an encoder, "coding" as used herein means encoding in a compressed bitstream. When implemented by a decoder, "coding" as used herein means decoding from a compressed bitstream.

In some implementations, MV=PMV, so only the index may be signaled. That is, MVD=0. In some situations (such as based on the inter prediction mode), it may not be necessary for the encoder to encode the index; rather, the index of the reference motion vector may be inferred at the decoder from other data within the bitstream.

In any of these cases, before decoding an inter-predicted block, the motion vector reference list is generated (constructed, created, determined). At an encoder, the motion vector reference list may be constructed according to predetermined rules; and, at a decoder, the list may be constructed (e.g., generated) according to the same predetermined rules. For example, the motion vector reference list may be constructed using motion vector candidates selected in a defined sequence and/or using a defined set of rules applied to motion vectors used for inter prediction of neighboring blocks to the current block. The neighboring blocks can include spatial neighboring blocks (i.e., blocks in the same current frame as the current block). The neighboring blocks can include temporal neighboring blocks (i.e., blocks in frames other than the current frame).

Many blocks can be searched to build the list of motion vector candidates for a current block. A longer list of motion vector candidates can in theory improve coding efficiency because it can reduce or eliminate motion vector residuals for many blocks of a frame. However, a longer list requires more buffers for storage, which may be undesirable, particularly in a hardware decoder. Additionally, a longer list may require a larger index to identify the motion vector selected as the reference motion vector, which involves a higher signaling cost. Limiting the maximum size for the list may exclude relevant motion vector candidates.

According to the teachings herein, when building the list of motion vector candidates, each new MV may be checked against existing MVs in the list to determine if the new MV is a distinct motion vector. A motion vector resolution of the current block may be used to shorten the list without sacrificing the efficiency of the motion vector prediction process. For example, if a difference between the new MV and an existing MV is less than a desired motion vector resolution, the new MV may be treated as a duplicate and excluded from the list of candidate MVs. Additionally, a motion vector resolution may be used to code the motion vector difference or residual. This allows the codec to exclude additional bits used to code information beyond the selected motion vector resolution.

Further details of motion vector resolution based motion vector prediction for video coding are described herein with initial reference to a system in which it can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
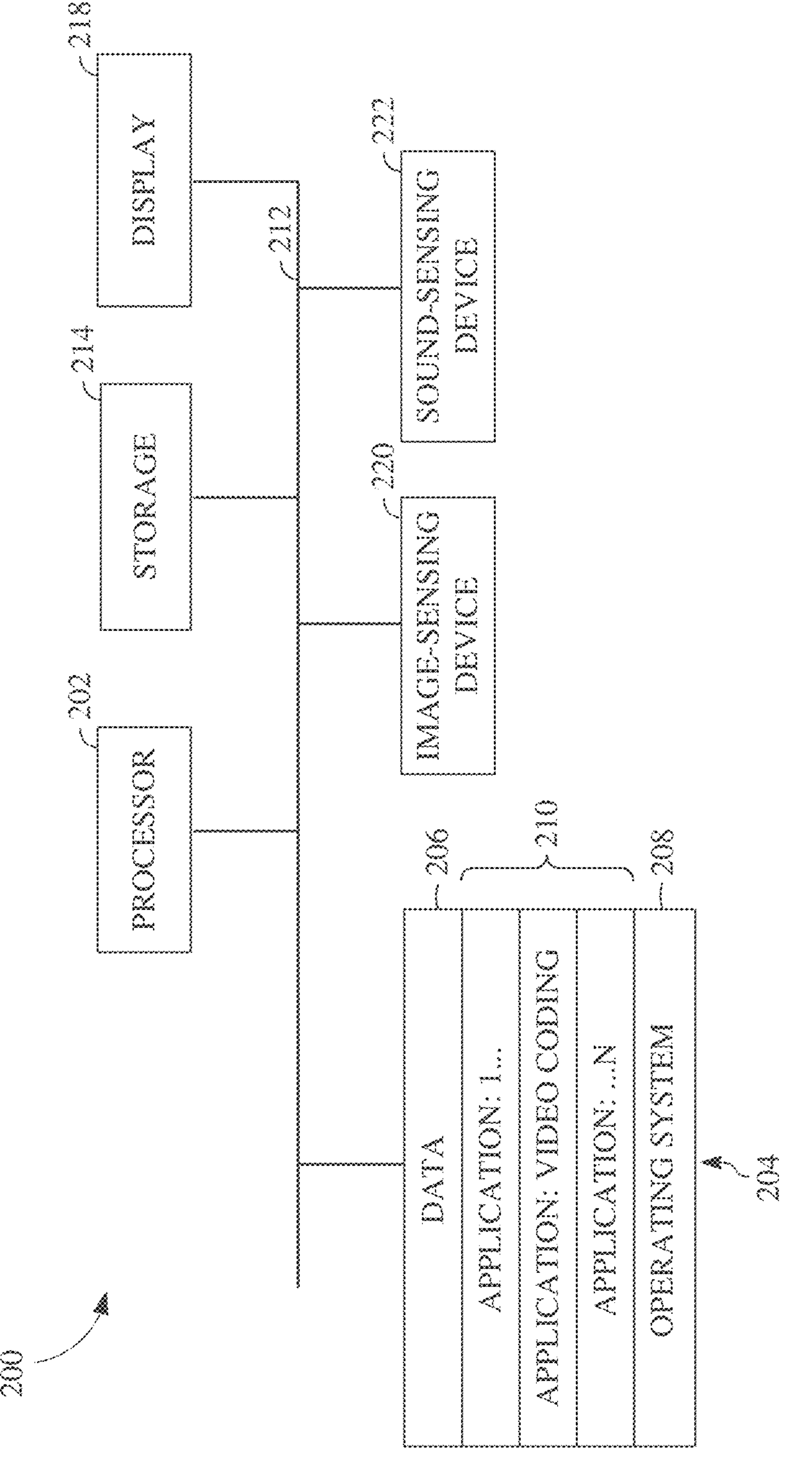
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a video streaming protocol based don the Hypertext Transfer Protocol (HTTP).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 (e.g., an apparatus) that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random-access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
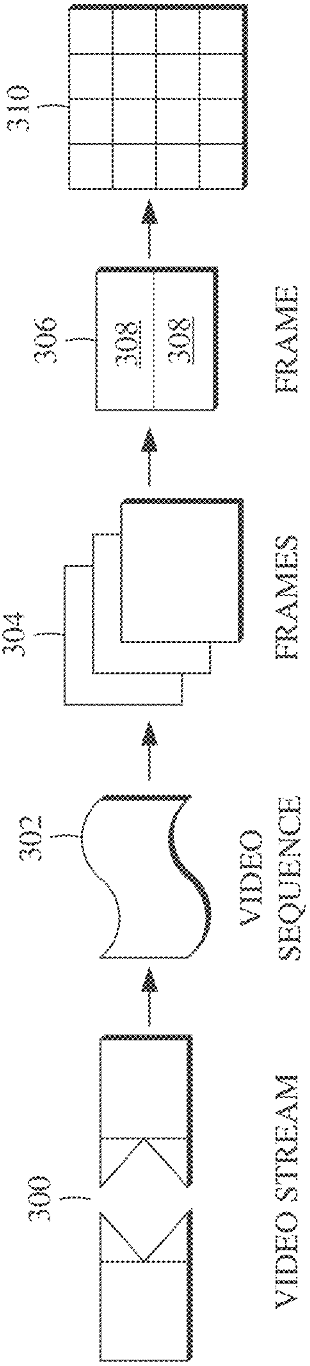
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macro-block are used interchangeably herein.

Figure 4:
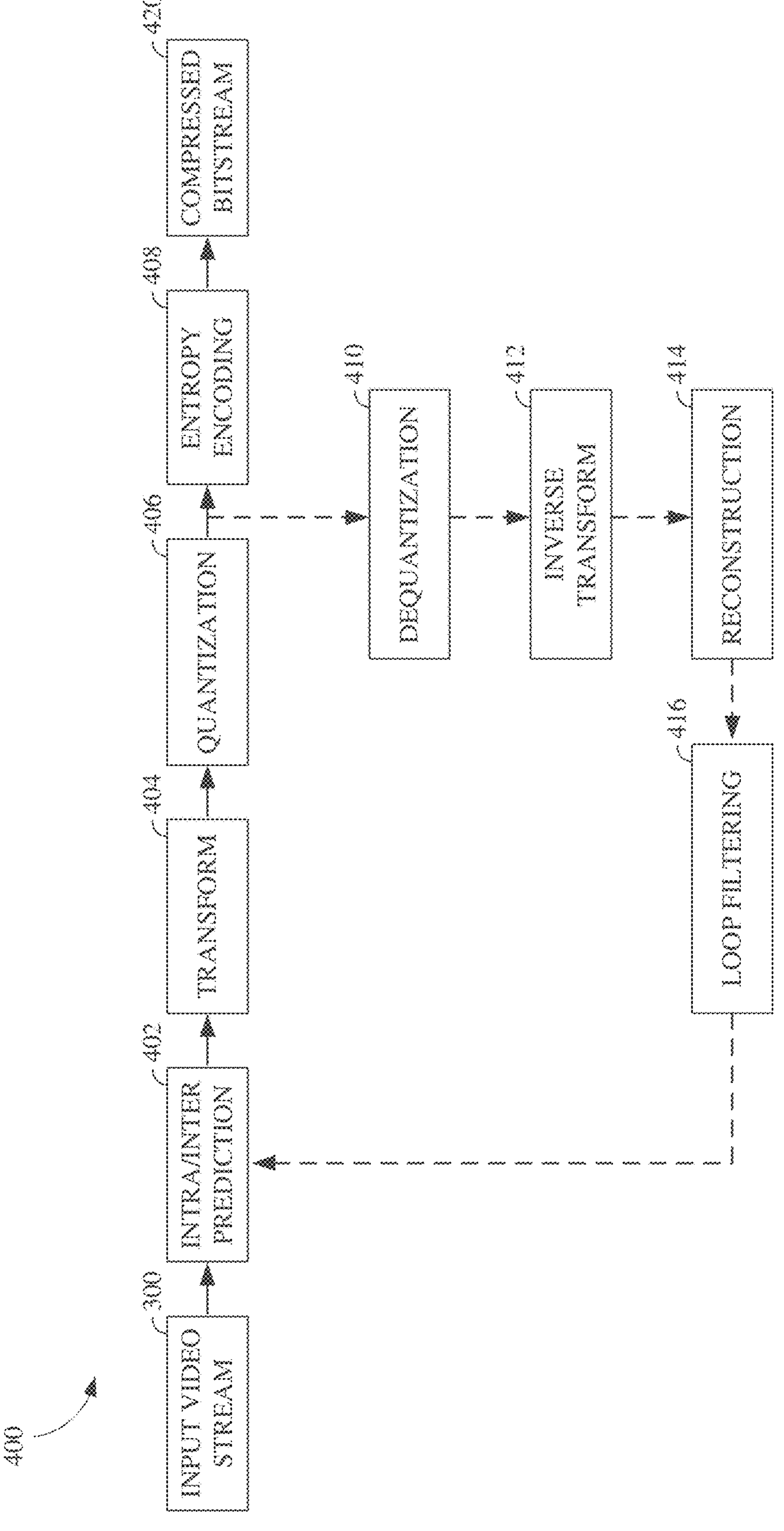
FIG. 4 is a block diagram of an encoder.

FIG. 4 is a block diagram of an encoder 400. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform-based encoder can quantize the residual signal directly without the transform stage 404 for certain blocks or frames. In another implementation, an encoder can have the quantization stage 406 and the dequantization stage 410 combined in a common stage.

Figure 5:
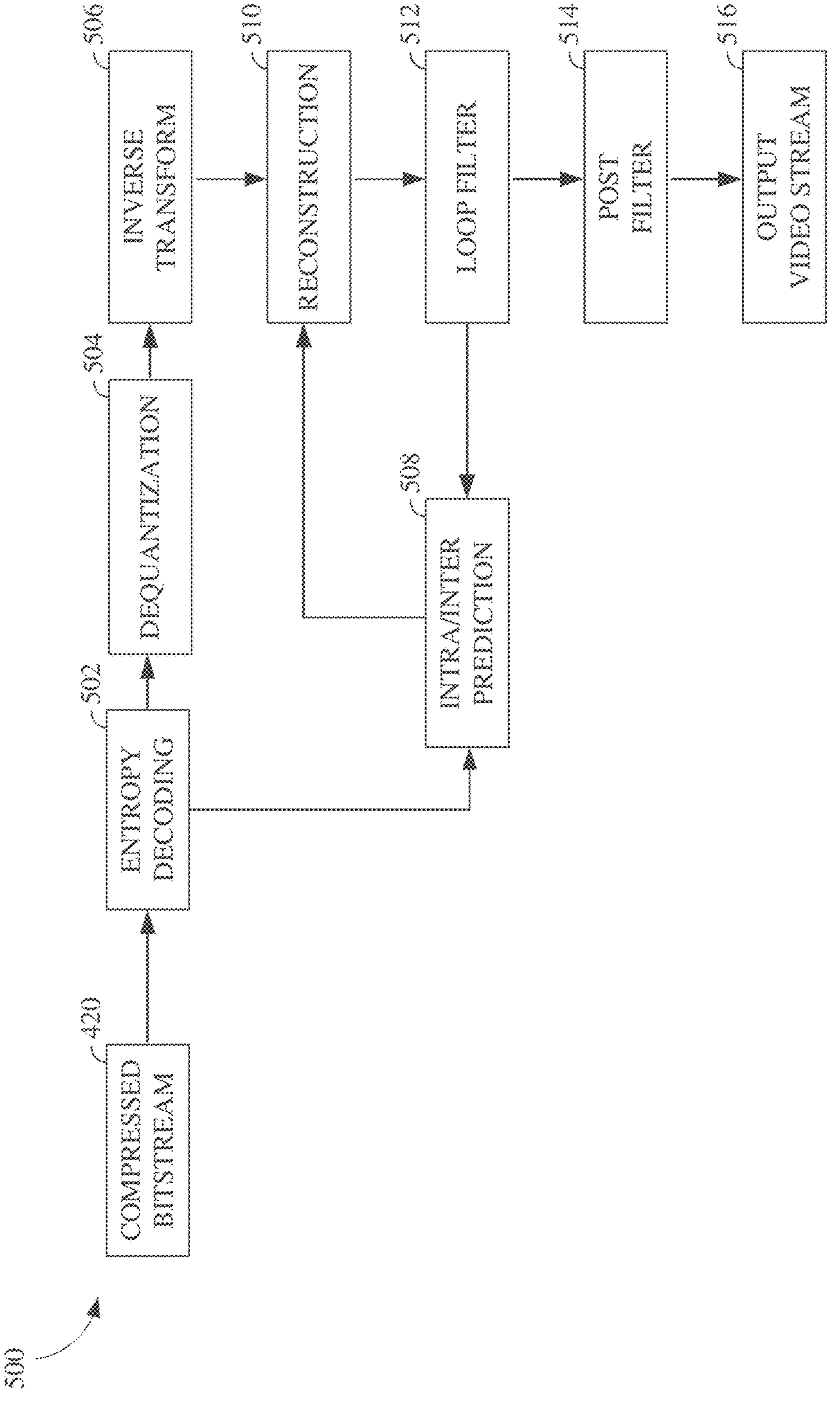
FIG. 5 is a block diagram of a decoder.

FIG. 5 is a block diagram of a decoder 500. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a post-loop filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the post-loop filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the post-loop filtering stage 514.

Figure 6:
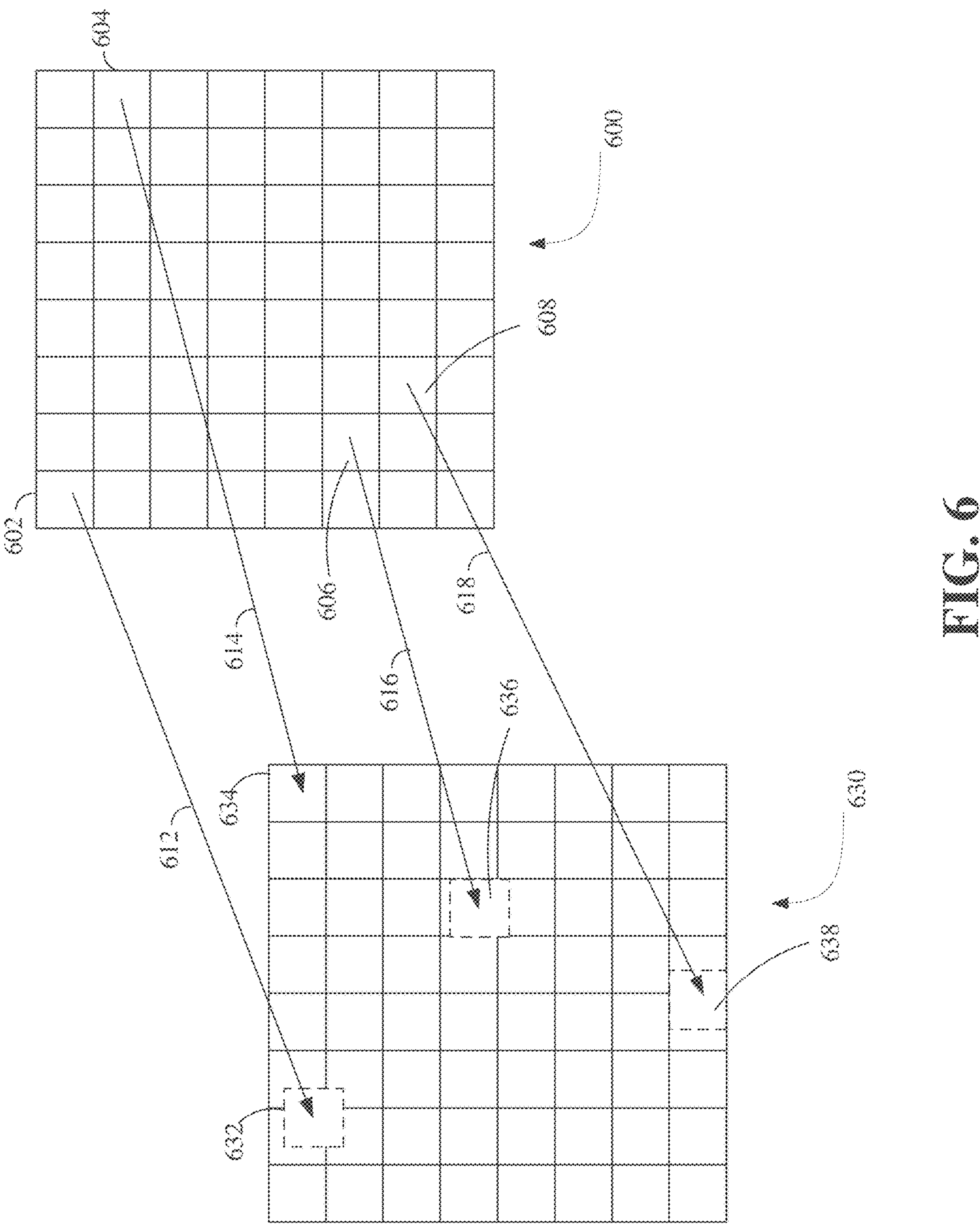
FIG. 6 is a diagram of motion vectors representing full and sub-pixel motion.

FIG. 6 is a diagram of motion vectors representing full and sub-pixel motion. In FIG. 6, several blocks 602, 604, 606, 608 of a current frame 600 are inter predicted using pixels from a reference frame 630. In this example, the reference frame 630 is a reference frame, also called the temporally adjacent frame, in a video sequence including the current frame 600, such as the video stream 300. The reference frame 630 is a reconstructed frame (i.e., one that has been encoded and decoded such as by the reconstruction path of FIG. 4) that has been stored in a so-called last reference frame buffer and is available for coding blocks of the current frame 600. Other (e.g., reconstructed) frames, or portions of such frames may also be available for inter prediction. Other available reference frames may include a golden frame, which is another frame of the video sequence that may be selected (e.g., periodically) according to any number of techniques, and a constructed reference frame, which is a frame that is constructed from one or more other frames of the video sequence but is not shown as part of the decoded output, such as the output video stream 516 of FIG. 5.

A prediction block 632 for encoding the block 602 corresponds to a motion vector 612. A prediction block 634 for encoding the block 604 corresponds to a motion vector 614. A prediction block 636 for encoding the block 606 corresponds to a motion vector 616. Finally, a prediction block 638 for encoding the block 608 corresponds to a motion vector 618. Each of the blocks 602, 604, 606, 608 is inter predicted using a single motion vector and hence a single reference frame in this example, but the teachings herein also apply to inter prediction using more than one motion vector (such as bi-prediction and/or compound prediction using two different reference frames), where pixels from each prediction are combined in some manner to form a prediction block.

As mentioned above, a list of motion vector candidates may be generated in an order according to predetermined rules. The predetermined rules and the number of candidates in the list may vary by codec. For example, in High Efficiency Video Coding (H.265), the list of MV candidates can include up to 5 MVs. In Versatile Video Coding (H.266), the list of motion vector candidates may be constructed using several modes, including intra-block copy (IBC) merge, block level merge, and sub-block level merge, where the number of motion vector candidates obtained using each is limited to 6 candidates, 6 candidates, and 5 candidates, respectively. In some implementations, more than one list may be generated such that which list to use depends upon conditions such as the mode used to code a current block.

Depending on the inter-prediction mode, different motion information may be coded in a compressed bitstream, such as the compressed bitstream 420 of FIG. 4 or 5. For example, if a block is coded using a merge mode, a reference frame index and an index (e.g., a merge index) into the motion vector reference list of motion vector candidates are coded to identify the reference frame and the motion vector used to encode the block. That is, a motion vector candidate corresponding to the index of the candidate in the list of motion vector candidates is selected, and the motion information of the merge candidate is set as the motion information of the block. If instead a motion vector is coded differentially, a motion vector predictor (e.g., the motion vector candidate resulting in the smallest residual) is selected from the motion vector reference list of motion vector candidates. The index of the selected motion vector in the list may be included in the compressed bitstream. The MVD may also be included (i.e., coded) in the compressed bitstream. Additionally, a reference frame index may also be included (i.e., coded) in the compressed bitstream.

The teachings herein are not limited to any particular technique for identifying reference motion vectors for consideration for a motion vector reference list and in what order the reference motion vectors are considered. One simple technique is to define a sequence of previously coded blocks of the current frame and one or more reference frames and consider motion vectors used to encode those blocks (e.g., for those of the previously coded blocks that were coded using inter prediction) in the sequence to add them to the motion vector reference list or omit them according to the teachings herein. Another technique is described by example in FIGS. 7A to 7C.

Figure 7B:
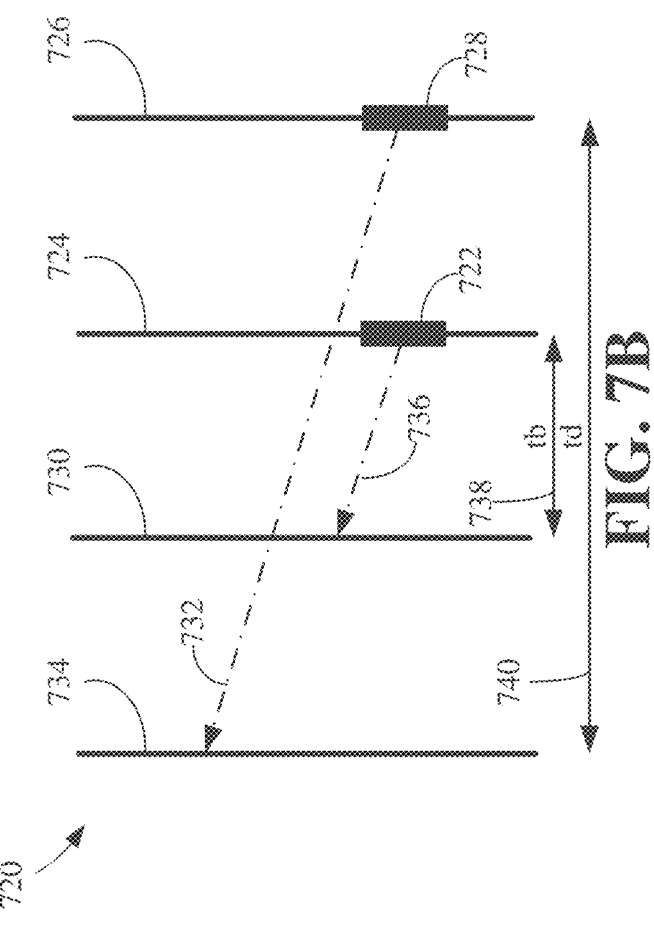
FIG. 7B illustrates an example of determining motion vector candidates for a current block based on temporal neighbors of the current block.
Figure 7A:
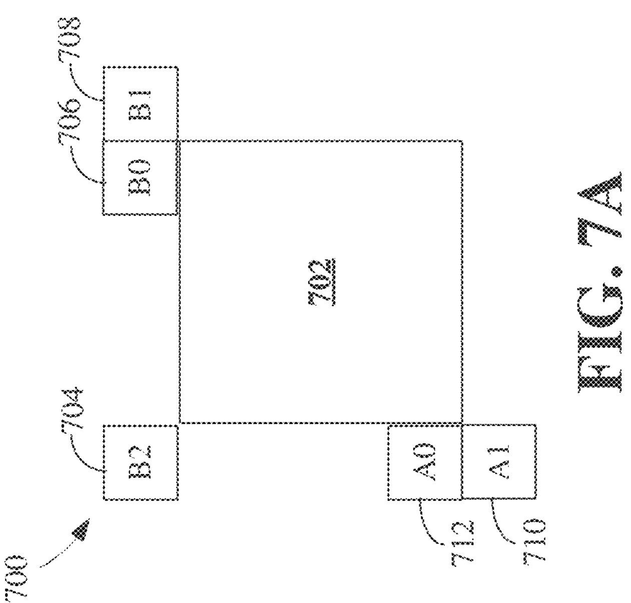
FIG. 7A illustrates an example of determining motion vector candidates for a current block based on spatial neighbors of the current block.

FIGS. 7A, 7B, and 7C illustrate examples of determining motion vector candidates for inclusion in a motion vector reference list. These examples describe determining motion vector candidates for merge modes, so they may be called merge candidates herein.

FIG. 7A illustrates an example of determining 700 motion vector candidates for a motion vector reference list of the current block based on spatial neighbors of the current block. The example may be referred to or may be known as determining or deriving spatial merge candidates.

A current block 702 may be "merged" with one of its spatially available neighboring block(s) to form a "region." FIG. 7A illustrates that spatially available neighboring blocks includes blocks 704-712 (i.e., blocks 704, 706, 708, 710, 712). As such, up to six motion vector candidates (i.e., corresponding to the motion vectors of the blocks 704-712) may be possible (i.e., added to the list of motion vector candidates or the merge list). However, more or fewer spatially neighboring blocks may be considered. In an example, a maximum of four merge candidates may be selected from amongst the blocks 704-712, also referred to as candidate blocks.

All pixels within the merged region share the same motion parameters, i.e., the same motion vector(s) and reference frame(s). Thus, there is no need to code and transmit motion parameters for each individual block of the region. Instead, for a region, only one set of motion parameters is encoded and transmitted from the encoder and received and decoded at the decoder. In an example, a flag (e.g., merge_flag) may be used to specify whether the current block is merged with an available neighboring block. Additionally, an index of the candidate motion vector in the motion vector reference list of the neighboring block with which the current block is merged may be sent FIG. 7B illustrates an example of determining 720 motion vector candidates for a motion vector reference list of the current block based on temporal neighbors of the current block. The example may be referred to or may be known as determining or deriving temporal merge candidates or as a temporal merge mode. In an example, the temporal merge mode may be limited to merging with temporally co-located blocks in neighboring frames. In another example, blocks in other frames other than a co-located block may also be used.

A co-located (also called a collocated) block may be a block that is in a same position as the current block in another frame. Any number of co-located blocks can be used. That is, the respective co-located blocks in any number of previously coded pictures can be used. In an example, the respective co-located blocks in all previously coded frames of the same group of pictures (GOP) as the frame of the current block are used. Motion parameters of the current block may be derived from temporally located blocks and used in the temporal merge.

The example of determining 720 illustrates that a current block 722 of a current frame 724 is being coded. A frame 726 is a previously coded frame, a block 728 is a co-located block in the frame 726 to the current block 722, and a frame 730 is a reference frame for the current frame. A motion vector 732 is the motion vector of the block 728. The frame 726, which includes the co-located block 728, may be referred to as the picture or frame. The motion vector 732 points to a reference frame 734. The reference frame 734, which is the reference frame of the collocated picture, may be referred to as the collocated reference picture or frame. As such, a motion vector 736, which may be a scaled version of the motion vector 732, can be used as a motion vector candidate for the current block 722. The motion vector 732 can be scaled by a distance 738 (denoted tb) and a distance 740 (denoted td). The distance can be the picture order count (POC) or the display order of the frames. As such, in an example, tb can be defined as the POC difference between the reference frame (i.e., the frame 730) of the current frame (i.e., the current frame 724) and the current frame; and td is defined to be the POC difference between the reference frame (i.e., the reference frame 734) of the co-located frame (i.e., the frame 726) and the co-located frame (i.e., the frame 726).

FIG. 7C illustrates an example of determining 750 motion vector candidates for a motion vector reference list for a current block 752 based on non-adjacent spatial candidates of the current block. A current block 752 illustrates a largest coding unit (which may be further divided into sub-blocks), which may be divided into sub-blocks and where at least some of the sub-blocks may be inter predicted. Blocks that are filled with the black color, such as a block 754, illustrate the neighboring blocks described with respect to FIG. 7A. Blocks filled with the dotted pattern, such as blocks 756, 758 are used for obtaining motion vector candidates for the current block 752 based on non-adjacent spatial candidates. The number of motion vector candidates based on non-adjacent spatial candidates may be 5, 10, fewer, or more motion vector candidates.

Another example of determining motion vector candidates (or merge candidates) for a motion vector reference list of a current block can be history based motion vector derivation, which may be used with a history based MV prediction (HMVP) mode.

In the HMVP mode, the motion information of a previously coded block can be stored in a table and used as a motion vector candidate for a current block. The table with multiple HMVP candidates can be maintained during the encoding/decoding process. The table can be reset (emptied) when a new row of largest coding units (which may be referred to as a superblock or a macroblock) is encountered.

In an example, the HMVP table size may be set to 6, which indicates that up to 6 HMVP candidates may be added to the table. When inserting a new motion vector into the table, a constrained first-in-first-out (FIFO) rule may be utilized wherein redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates could be used in the merge candidate list construction process. The latest several HMVP candidates in the table can be checked in order and inserted to the motion vector reference list after the temporal merge candidate. A codec may apply redundancy check on the HMVP candidates to the spatial or temporal merge candidate(s) as described in additional detail below.

Yet another example of determining motion vector candidates for a motion vector reference list for a current block can be based on averaging predefined pairs of motion vector candidates in the already generated groups of motion vector candidates of the list.

Pairwise average motion vector candidates can be generated by averaging predefined pairs of candidates in the existing merge candidate list, using motion vectors of already generated groups of motion vectors. The first merge candidate may be defined as p0Cand, and the second merge candidate may be defined as p1Cand, respectively. The averaged motion vectors are calculated according to the availability of the motion vector of p0Cand and p1Cand separately for each reference list. If both motion vectors are available in one list, the two motion vectors can be averaged even when they point to different reference frames, and the reference frame for the average motion vector can be set to be the same reference frame as that of p0Cand; if only one MV is available, use the one directly; if no motion vector is available, keep this list invalid. Also, if the half-pel interpolation filter indices of p0Cand and p1Cand are different, the half-pel interpolation filter can be set to 0.

In yet another example, one or more zero MVs may be generated. A current reference frame of a current block may use one of N reference frames. A zero MV is a motion vector with displacement (0, 0). Multiple zero MVs may be included using at least some of the N reference frames.

It is again noted that the techniques for determining motion vector candidates herein are not limited and that different codecs may implement these techniques differently or may include fewer or more techniques for determining motion vector candidates. An order of evaluation of any of the foregoing blocks for inclusion in a motion vector candidates may be predefined. However, for brevity, the order is not described herein.

Further, where multiple techniques are used, they may each generate a group of motion vector candidates that can be used to populate one or more motion vector reference lists. The motion vector candidates of the groups may be appended to the list in a predefined order. For example, spatial merge candidates may be first be added to the list. If the list is not full, then at least some of temporal merge candidates may be added. If the list is still not full, then at least some of the HMVP candidates may be added. If the list is still not full, then at least some of the pairwise average MV candidates may be added. If the list is still not full, then one or more zero MVs may be added.

The list has a maximum number of motion vector candidates (e.g., has a finite size), but the list may have fewer than the maximum. For example, the list of motion vector candidates may have a size of 6 MVs, 10 MVs, 15 MVs, or some other size. The size of the list of candidate MVs may be signaled in the compressed bitstream, and the maximum allowed size of the merge list may be pre-defined. For each coding unit, an index of the best candidate may be encoded using truncated unary binarization. In an example, the first bin of the index may be coded with context, and bypass coding may be used for other bins.

Figure 8:
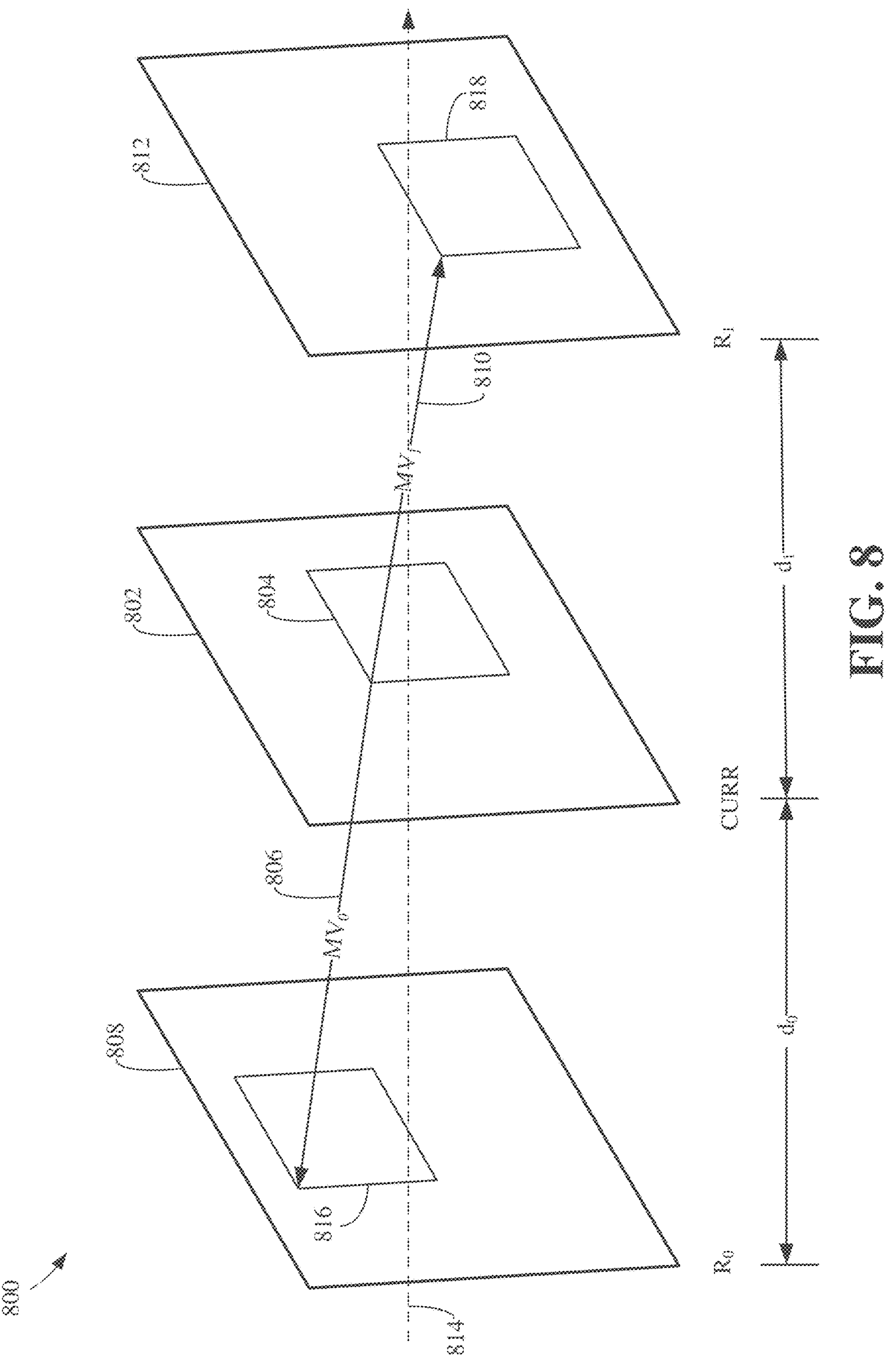
FIG. 8 is an illustration of compound inter-prediction.

One or more lists may be determined for a current block as described previously. Where the current block is predicted using compound inter prediction, separate lists may be determined for each of the first motion vector and the second motion vector. FIG. 8 is an illustration 800 of a compound inter-prediction mode. The illustration 800 includes a current frame 802 that includes a current block 804 to be coded (i.e., encoded or decoded) using a first MV 806 (i.e., $MV_0$) that refers (i.e., points) to a first reference frame 808 (i.e., $R_0$) and a second MV 810 (i.e., $MV_1$) that refers to a second reference frame 812 (i.e., $R_1$). A line 814 illustrates the display order, in time, of the frames. The illustration 800 is an example of bi-directional compound inter prediction because the current frame 802 is between the first reference frame 808 and the second reference frame 812 in the display order. However, the disclosure herein is not limited to bi-directional compound prediction, and the techniques described herein can also be used with (e.g., adapted to) uni-directional compound prediction (i.e., where the two frames used for compound inter prediction are both before or both after the current frame in the display order).

The distance, in display order, between the first reference frame 808 and the current frame 802 is denoted do; and the distance, in display order, between the current reference frame 802 and the second reference frame 812 is denoted di. While not specifically shown in FIG. 8, each of the first MV 806 and the second MV 810 includes a horizontal and vertical offset. Thus, $MV_{0,x}$ and $MV_{0,y}$ can denote, respectively, the horizontal and the vertical components of the first MV 806; and $MV_{1,x}$ and $MV_{1,y}$ can denote, respectively, the horizontal and the vertical components of the second MV 810. The first MV 806 and the first reference frame 808 can be used to obtain a first prediction block 816 (denoted $P_0$) for the current block 804; and the second MV 810 and the second reference frame 812 can be used to obtain a second prediction block 818 (denoted $P_1$) for the current block 804. A final prediction block for the current block 804 can be obtained as a combination (e.g., a pixel-wise weighted average) of the first prediction block 816 and the second prediction block 818.

Adaptive motion vector precision can be used to code the motion vector difference or residual. An encoder can first pick a motion vector precision (also called resolution), e.g., one-eighth pixel, one-quarter pixel, one-half pixel, etc., at the coding block level (or slice level, frame level, etc.). Thereafter, motion vector residual (or difference) coding can be conducted only at the given precision level. Where a coarse resolution, for example one-half pixel precision, is picked, the encoder can save the additional bits that would have otherwise been required to code the information beyond that precision (e.g., ¼-pixel, ⅛-pixel information). The encoder transmits the motion vector precision to the decoder in the bitstream, or the decoder may infer the motion vector precision from other information within the bitstream such as the prediction mode, the quantizer value used for quantization, etc. Where motion vector residuals are coded, using adaptive motion vector precision can provide compression efficiency gains.

The use of adaptive motion vector precision can be useful where motion vector residuals are encoded. However, additional benefits can be achieved by leveraging the motion vector precision for the construction of the motion vector reference list, whether the motion vector precision is used to code motion vector residuals or not.

Figure 9:
FIG. 9 is a flowchart of a technique for motion vector prediction based on motion vector resolution.
Figure 9:
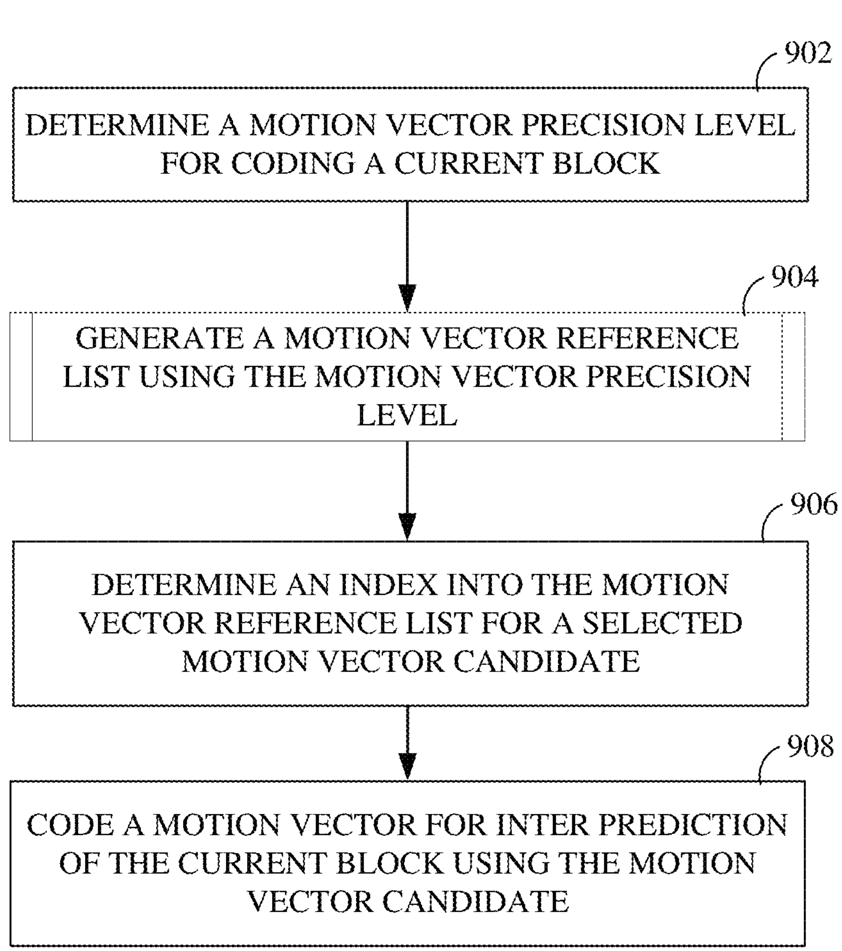

FIG. 9 is a flowchart of a technique 900 for motion vector prediction based on motion vector resolution. The technique 900 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the technique 900. The technique 900 may be implemented in whole or in part in a prediction stage of an encoder, a decoder, or both, such as in the intra/inter prediction stage 402 of the encoder 400 of FIG. 4 and/or the intra/inter prediction stage 508 of the decoder 500 of FIG. 5. The technique 900 can be implemented using specialized hardware or firmware. Multiple processors, memories, or both, may be used.

At step 902, a motion vector precision level for a motion vector for inter prediction of a current block is determined. At an encoder, the motion vector precision level may be determined using a rate-distortion loop or the like, may be determined based on characteristics of, e.g., a block, or may be determined arbitrarily. In some implementations, the motion vector precision level can be determined and coded at a frame level, a slice level, or a (e.g., coding) block level. At a decoder, the motion vector precision level may be determined by decoding an indicator of the motion vector precision level, such as a flag, from a bitstream, or may be inferred from other data in the bitstream, such as the same characteristics used by the encoder according to common rules.

The motion vector precision level may be a motion vector resolution (i.e., precision), for example, ⅛ pixel, ¼ pixel, ½ pixel, 1 pixel, 4 pixels, or the like. The motion vector precision level may identify a single resolution or precision value or may identify a first resolution used for generating a motion vector reference list (i.e., a list of motion vector candidates) and a second resolution used coding motion vector residuals as described in more detail below.

The motion vector precision level may be coded as a value (index, flag, identifier, etc.) representing an index to a motion vector precision level list. The motion vector precision level list may include, for each motion vector precision level, the first resolution (i.e., a first precision value) and the second resolution (i.e., a second precision value). For example, the index to the motion vector precision list may indicate an entry within the motion vector precision level list, where the motion vector precision level list includes multiple entries, each associated with a respective resolution (i.e., precision) for generating the motion vector reference list. Each entry may also be associated with a respective resolution for coding the motion vector for the current block (e.g., coding motion vector residuals at the resolution). In the motion vector precision level list, the first resolution and the second resolution for a given motion vector precision level may be equal, the first resolution may be greater than the second resolution, or the first resolution may be lesser than the second resolution. Most desirably, the resolution used for the motion vector reference list has a finer resolution that the resolution used for coding the motion vector. The encoder can signal the motion vector precision level list, or the encoder and decoder can each store the same motion vector precision level list. An example motion vector precision level list is shown in Table 1.

TABLE 1

| Motion vector precision level | Resolution used for the motion vector reference list | Resolution used for the motion vector difference |
|---|---|---|
| 1 | ⅛ pixel | ⅛ pixel |
| 2 | ¼ pixel | ½ pixel |
| 3 | ½ pixel | 1 pixel |
| 4 | 1 pixel | 4 pixels |

Thus, coding the motion vector precision level at an encoder at step 902 may include signaling (e.g., encoding) the index to the motion vector precision list. Correspondingly, coding the motion vector precision level at a decoder at step 902 may include decoding the index.

At step 904, the motion vector reference list is generated using the motion vector precision level. The motion vector reference list may be generated using the first resolution of the motion vector precision level.

In some implementations, the motion vector reference list is generated using the motion vector precision level by rounding each reference motion vector in sequence to the nearest motion vector at a precision or resolution corresponding to the precision level, and the rounded motion vector is compared to the existing motion vector candidates in the list to decide if the motion vector is a new candidate to be added to the list. Some threshold for making this latter determination can be selected and coded at the encoder, can be decided a priori such that the value is available to each of the encoder and decoder, or can be determined from other information decoded from the bitstream. In this implementation, all motion vector candidates may be coded at the same resolution.

Figure 10:
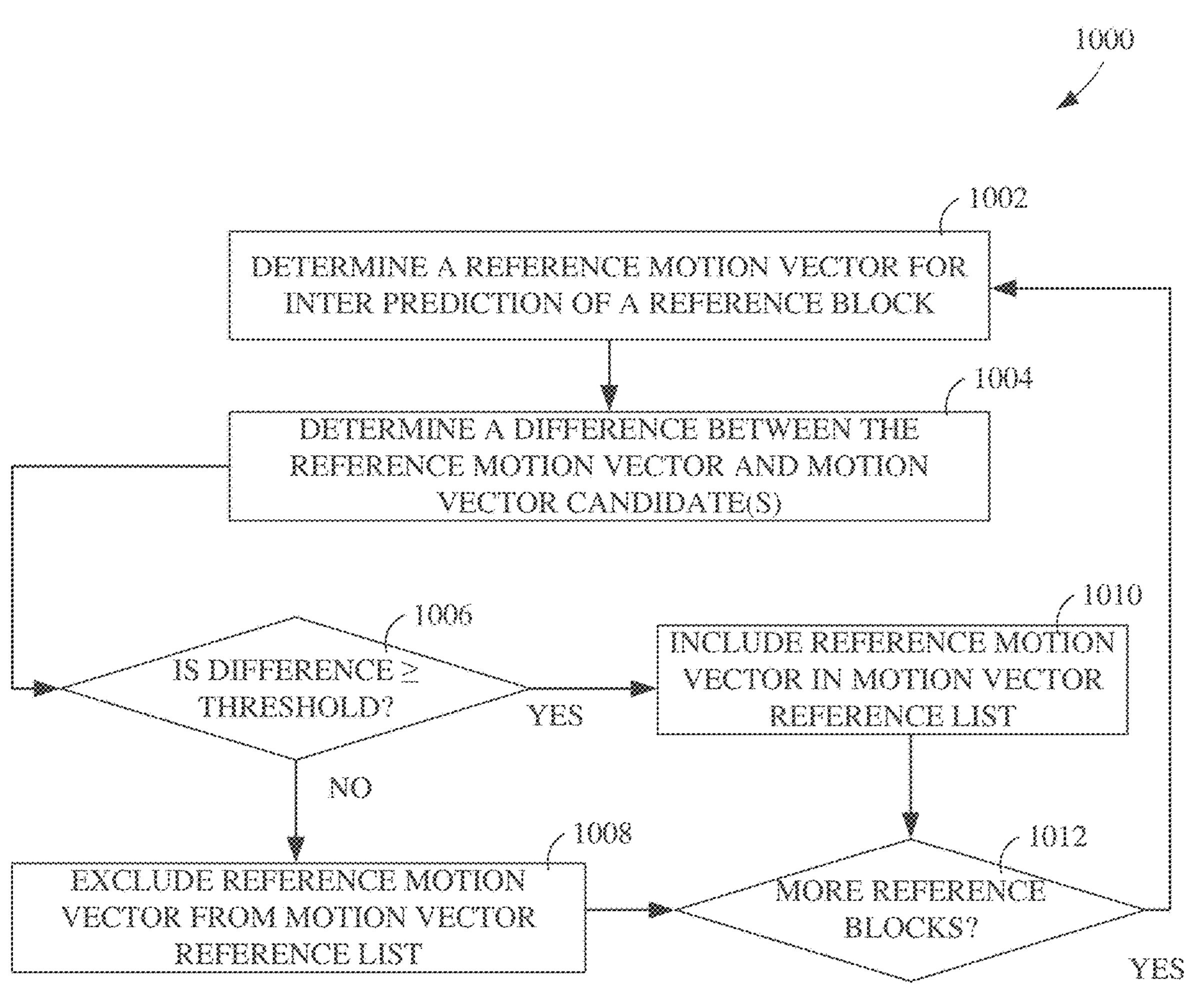
FIG. 10 is a flowchart of a technique that can be used to generate a motion vector reference list for use in the technique of FIG. 9.

In some implementations, the motion vector reference list is generated using the motion vector precision level to limit the number of motion vector candidates in the motion vector reference list. For example, the level may be used to exclude duplicate (e.g., substantially similar) reference motion vectors from the motion vector reference list. An example of a technique 1000 for generating the motion vector reference list is shown in FIG. 10.

The technique 1000 may be used at each of the encoder and the decoder to generate or build a single motion vector reference list based on or using the motion vector precision level or to generate or build multiple motion vector reference lists, where each motion vector reference list corresponds to a different motion vector precision level. For example, the encoder may build separate motion vector reference lists for multiple indexes to the motion vector precision level list. Details of the technique 1000 are described below.

At step 906, an index into the motion vector reference list for a selected motion vector candidate is determined. At the encoder, the motion vector candidate may be selected from the motion vector reference list according to various techniques, such as a rate-distortion optimization techniques or finding the smallest difference between the motion vector and each motion vector candidate. The selected motion vector candidate may be encoded into the bitstream as an index directed to the motion vector reference list. At the decoder, the index may be coded by decoding the explicitly signaled index directed to the motion vector reference list that is generated in the same manner as at the encoder. In some implementations, the index may be inferred at the decoder based on prediction mode, transform mode, or the like.

At step 908, a motion vector for inter prediction of the current block is coded using the selected motion vector candidate.

The motion vector may be coded at the encoder by, for example, determining a motion vector residual between the motion vector and the selected motion vector candidate. The motion vector may be coded into the bitstream as described above with regards to FIG. 4. At the decoder, coding the motion vector at step 908 can include decoding the motion vector residual and adding the motion vector residual to the selected motion vector candidate.

In some implementations, coding the motion vector at step 908 coding the motion vector using the motion vector precision level. At an encoder, for example, coding the motion vector can include determining a motion vector residual between the motion vector and the selected motion vector candidate and coding the motion vector residual into the bitstream at the resolution indicated by the motion vector precision level. At the decoder, coding the motion vector at step 908 can include decoding the motion vector residual at the (e.g., second) resolution indicated by the motion vector precision level and adding the motion vector residual to the selected motion vector candidate. Bits identifying the motion vector residual beyond the selected resolution may be excluded from the bitstream.

FIG. 10 is a flowchart of a technique 1000 that can be used to generate a motion vector reference list. This is an example of building or generating the motion vector reference list referred to at step 904. The technique 1000 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the technique 1000. The technique 1000 may be implemented in whole or in part in the intra/inter prediction stage 402 of the encoder 400 of FIG. 4 and/or the intra/inter prediction stage 508 of the decoder 500 of FIG. 5. The technique 1000 can be implemented using specialized hardware or firmware. Multiple processors, memories, or both, may be used.

At step 1002, a motion vector for inter prediction of a reference block is determined. The reference block may be a block coded before the current block, such as those described with regards to FIGS. 7A-7C. In certain embodiments, multiple respective motion vectors for inter prediction of multiple reference blocks coded before the current block may be determined.

At step 1004, a difference between the motion vector and a motion vector candidate that is already stored in the motion vector reference list is determined. The difference may be an absolute difference. The motion vector and the motion vector candidate may comprise an offset (i.e., a displacement) in the horizontal direction (i.e., a row component or $MV_x$) and a displacement in the vertical direction (i.e., a column component or $MV_y$). The difference may be the difference between the row component of the motion vector and the row component of the motion vector candidate, the difference between the column component of the motion vector and the column component of the motion vector candidate, or both. If the motion vector is the first motion vector considered (i.e., there is no motion vector candidate yet included in the list), the motion vector is added to the motion vector reference list as a motion vector candidate without performing this and subsequent steps of the technique 1000.

At step 1006, the technique 1000 determines if the difference between the motion vector and the motion vector candidate is greater than or equal to a threshold value. The threshold value may be based on the motion vector precision level. For example, the threshold value may be the first resolution used for the motion vector reference list for the motion vector precision level coded at step 902. In some implementations, the threshold value may be based on the resolution of the motion vector for inter prediction of the current block (i.e., the motion vector resolution for the current block). The threshold value may be the resolution of the current motion vector, such as ¼, ½, ⅛, etc. The threshold value may be a normalized value of the resolution.

If the difference determined at step 1004 is less than the threshold value, the technique 1000 proceeds from step 1006 to step 1008, where the motion vector is excluded from the motion vector reference list. That is, the motion vector from the reference block is not a motion vector candidate because it too closely matches a motion vector candidate already within the list.

If the difference determined at step 1004 is greater than or equal to the threshold value, the motion vector may be added (included, etc.) in the motion vector reference list as a motion vector candidate. However, there may be more than one motion vector candidate in the motion vector reference list. Comparing the motion vector to each of the motion vector candidates in the motion vector reference list is beneficial. Accordingly, the technique 1000 inquires at step 1010 whether there are any more motion vector candidates in the motion vector reference list to consider. If not, the motion vector can be included in the motion vector reference list as a motion vector candidate at step 1012. If there are more motion vector candidates in the motion vector reference list to consider, the technique 1000 returns to step 1004 to determine the difference between the motion vector and another motion vector candidate from the motion vector reference list and to compare that difference to the threshold value at step 1006. In this way, only if the motion vector is determined to be a distinctive motion vector as compared to all existing motion vector candidates in the motion vector reference list will it be included in the motion vector reference list at step 1012.

Whether the (e.g., reference) motion vector is included (stored) in the motion vector reference list at step 1012 or is excluded from the motion vector reference list at step 1008, the technique 1000 may be repeated for the motion vector of each reference block (e.g., until the reference list is full). The motion vector added at step 1012 is now a motion vector candidate for comparison with subsequent motion vectors determined at step 1002.

Determining the difference between the motion vector and the motion vector candidate from the motion vector reference list and comparing the difference to the threshold value may be performed by code. For example, representing the motion vector as MV1, the motion vector candidate from the motion vector reference list as MV2, and the threshold value as T, the code may be represented as follows.

If (|MV2−MV1|<*T*), exclude MV1

In another example, when the difference is both the difference between the row component of the motion vector and the row component of the motion vector candidate from the motion vector reference list and the difference between the column component of the motion vector and the column component of the motion vector candidate from the motion vector reference list, the code may be represented as follows If(|MV2.row−MV1.row|<*T*&&|MV2.col−MV1.col|<*T*), exclude MV1

That is, the difference between the motion vector and the motion vector candidate from the motion vector reference list may include absolute differences between respective row and column components of the motion vector and the motion vector candidate from the motion vector reference list, and each value must be below the threshold value T to exclude the motion vector from the motion vector reference list. That is, either value must be at or above the threshold value T to include the motion vector in the motion vector reference list.

Although the query at step 1006 asks whether the difference is greater than or equal to the threshold, the query can ask whether the difference is greater than the threshold. In these embodiments, if the difference determined at step 1006 is equal to the threshold value, the technique 1000 proceeds to step 1008 rather than to step 1010.

As mentioned, the technique 1000 may be repeated for a motion vector for inter prediction of a second (or further) reference block. In general, the technique 1000 may be repeated for multiple reference blocks where a single motion vector reference list is generated. The technique 1000 may be repeated for additional motion vectors for inter prediction of the current block. For example, where the prediction mode for the current block is a compound prediction mode formed of two or more reference blocks, the technique 1000 may be repeated for motion vectors that may be used for motion vector prediction of a second motion vector of the current block. In this case, the motion vectors may be included at step 1012 in a single motion vector list. Alternatively, each motion vector for inter prediction of the current block may be associated with separate motion vector reference lists (e.g., a first motion vector reference list and a second motion vector reference list). Repeating the technique 1000 for an additional motion vector for inter prediction of the current block may use the motion vector resolution of the additional motion vector for determining the threshold value. A motion vector reference list may be generated for respective reference frames in some implementations.

For simplicity of explanation, the processes herein are depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word “example” is used herein to mean serving as an example, instance, or illustration. Any aspect or design described herein as “example” is not necessarily to be construed as preferred or advantageous over other aspects or designs. Rather, use of the word “example” is intended to present concepts in a concrete fashion. As used in this application, the term “or” is intended to mean an inclusive “or” rather than an exclusive “or.” That is, unless specified otherwise, or clear from context, “X includes A or B” is intended to mean any of the natural inclusive permutations. That is, if X includes A; X includes B; or X includes both A and B, then “X includes A or B” is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:

determining a motion vector precision level for coding a current block;

generating a motion vector reference list using the motion vector precision level, wherein generating the motion vector reference list comprises:

identifying a motion vector for inter-prediction of a reference block coded before the current block;

determining that a difference between the motion vector and each motion vector candidate stored in the motion vector reference list is greater than a threshold value that is based on the motion vector precision level; and storing the motion vector in the motion vector reference list when the difference is greater than the threshold value;

determining an index into the motion vector reference list, the index identifying a motion vector candidate from the motion vector reference list; and coding a motion vector for inter prediction of the current block using the motion vector candidate.

2. The method of claim 1, wherein coding the motion vector comprises coding a motion vector difference between the motion vector and the motion vector candidate using the motion vector precision level.

3. The method of claim 1, wherein the motion vector precision level includes a first pixel resolution for generating the motion vector reference list and a second pixel resolution for coding the motion vector.

4. The method of claim 3, wherein the first pixel resolution is equal to the second pixel resolution.

5. The method of claim 3, wherein the first pixel resolution is a finer resolution than the second pixel resolution.

6. The method of claim 1, wherein determining the motion vector precision level comprises decoding, from a compressed bitstream, an index into a motion vector precision level list that identifies from the motion vector precision level, the motion vector precision level list having multiple motion vector precision levels.

7. The method of claim 1, wherein coding the motion vector for inter prediction of the current block using the motion vector candidate comprises:

decoding a flag indicating that the motion vector is the motion vector candidate.

8. The method of claim 1, wherein coding the motion vector for inter prediction of the current block using the motion vector candidate comprises:

decoding, from a compressed bitstream, a motion vector residual using the motion vector precision level; and adding the motion vector residual to the motion vector candidate to reconstruct the motion vector.

9. An apparatus, comprising:

at least one processor configured to:

determine a motion vector precision level for coding a current block;

generate a motion vector reference list using the motion vector precision level, wherein to generate the motion vector reference list comprises to:

identify a motion vector for inter-prediction of a reference block coded before the current block;

determine that a difference between the motion vector and each motion vector candidate stored in the motion vector reference list is greater than a threshold value that is based on the motion vector precision level; and store the motion vector in the motion vector reference list when the difference is greater than the threshold value;

determine an index into the motion vector reference list, the index identifying a motion vector candidate from the motion vector reference list; and code a motion vector for inter prediction of the current block using the motion vector candidate.

10. The apparatus of claim 9, wherein the motion vector precision level includes a first resolution for generating the motion vector reference list and a second resolution for coding the motion vector.

11. The apparatus of claim 10, wherein to code the motion vector comprises to code a motion vector residual using the second resolution, wherein the motion vector residual comprises a difference between the motion vector and the motion vector candidate.

12. The apparatus of claim 10, wherein the second resolution shares a common resolution value with the first resolution, or the second resolution is a more coarse resolution value than the first resolution, and wherein to generate the motion vector reference list using the motion vector precision level comprises to include each of the motion vector candidates within the motion vector reference list at the first resolution.

13. The apparatus of claim 9, wherein to determine the motion vector precision level comprises to decode, from a compressed bitstream, an index into a motion vector precision level list that identifies the motion vector precision level, the motion vector precision level list having multiple motion vector precision levels, each multiple motion vector precision level having a respective first resolution for generating the motion vector reference list and a respective second resolution for coding the motion vector.

14. The apparatus of claim 9, wherein the difference between the motion vector and the motion vector candidate is an absolute difference.

15. The apparatus of claim 9, wherein:

the motion vector comprises a row component and a column component; and the motion vector candidate comprises a row component and a column component; and the processor is configured to determine the difference between the motion vector and the motion vector candidate is greater than the threshold value when:

the difference between the row component of the motion vector and the row component of the motion vector candidate is greater than the threshold value; and the difference between the column component of the motion vector and the column component of the motion vector candidate is greater than the threshold value.

16. The apparatus of claim 9, wherein to determine a motion vector precision level comprises to decode an index for a motion vector precision level list, wherein the motion vector precision level list includes multiple entries, each associated with a respective resolution for generating the motion vector reference list, and the index indicates an entry within the motion vector precision level list.

17. A non-transitory, computer-readable storage medium comprising instructions that, when executed by a processor, perform operations comprising:

determining a motion vector precision level for coding a current block;

generating a motion vector reference list using the motion vector precision level, wherein generating the motion vector reference list comprises:

identifying a motion vector for inter-prediction of a reference block coded before the current block;

determining that a difference between the motion vector and each motion vector candidate stored in the motion vector reference list is greater than a threshold value that is based on the motion vector precision level; and storing the motion vector in the motion vector reference list when the difference is greater than the threshold value;

determining an index into the motion vector reference list, the index identifying a motion vector candidate from the motion vector reference list; and coding a motion vector for inter prediction of the current block using the motion vector candidate.

18. The non-transitory, computer-readable storage medium of claim 17, wherein coding the motion vector comprises coding a motion vector difference between the motion vector and the motion vector candidate using the motion vector precision level.

19. The non-transitory, computer-readable storage medium of claim 17, wherein the motion vector precision level includes a first pixel resolution for generating the motion vector reference list and a second pixel resolution for coding the motion vector.

20. The non-transitory, computer-readable storage medium of claim 17, wherein determining the motion vector precision level comprises decoding, from a compressed bitstream, an index into a motion vector precision level list that identifies from the motion vector precision level, the motion vector precision level list having multiple motion vector precision levels.

* * * * *